(12) United States Patent
Buckley et al.

(10) Patent No.: US 9,606,229 B2
(45) Date of Patent: Mar. 28, 2017

(54) HIGHLY EFFICIENT NIR LIGHT DISTRIBUTION FOR IMAGING BASED INTRUSION DETECTION

(71) Applicant: Honeywell International Inc., Morristown, NJ (US)

(72) Inventors: Mark Clifford Buckley, Pollock Pines, CA (US); Jie Zhao, Futian District (CN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 330 days.

(21) Appl. No.: 14/499,986

(22) Filed: Sep. 29, 2014

(65) Prior Publication Data

US 2016/0091607 A1 Mar. 31, 2016

(51) Int. Cl.
*G01S 17/89* (2006.01)
*G02B 19/00* (2006.01)
(Continued)

(52) U.S. Cl.
CPC .......... *G01S 17/026* (2013.01); *G01S 7/4813* (2013.01); *G01S 17/89* (2013.01); *G02B 19/009* (2013.01);
(Continued)

(58) Field of Classification Search
CPC . F21V 5/04; F21V 5/008; F21V 5/046; F21V 5/043; F21V 5/045; F21V 5/08;
(Continued)

(56) References Cited

U.S. PATENT DOCUMENTS

| | | | | |
|---|---|---|---|---|
| 4,609,978 A | * | 9/1986 | Hsieh | F21V 5/04 362/311.06 |
| 5,917,660 A | * | 6/1999 | Ohtaki | G02B 3/06 359/710 |

(Continued)

FOREIGN PATENT DOCUMENTS

| | | |
|---|---|---|
| DE | 20 2013 011 143 U1 | 5/2014 |
| EP | 2 175 193 A1 | 4/2010 |

OTHER PUBLICATIONS

Extended European search report from corresponding EP patent application 15186969.0, dated Mar. 9, 2016.
(Continued)

*Primary Examiner* — David A Vanore
(74) *Attorney, Agent, or Firm* — Husch Blackwell LLP

(57) ABSTRACT

An apparatus is provided that includes a near infrared (NIR) light emitting diode (LED) having a predominant axis of NIR light transmission from the NIR LED and a lens that disperses NIR light received from the NIR LED with respect to first and second planes, the lens having an air to lens light entry boundary where light from the NIR LED enters a surface of the lens and a lens to air boundary where the light exits the lens in each of the first and second planes, wherein an intersection formed by the second plane with the surface is a line that is concave on each side of the predominant axis, and wherein a radius of the air to lens light entry boundary of the line successively increases over each span of a predetermined number of degrees progressing outwards along the line from the predominant axis.

20 Claims, 5 Drawing Sheets

(51) Int. Cl.
  *G01S 17/02*   (2006.01)
  *G01S 7/481*   (2006.01)
  *G08B 13/196*  (2006.01)
  *G01J 5/08*    (2006.01)

(52) U.S. Cl.
  CPC ..... *G02B 19/0014* (2013.01); *G02B 19/0061* (2013.01); *G08B 13/19626* (2013.01); *G01J 5/0806* (2013.01)

(58) Field of Classification Search
  CPC .......... F21V 13/04; F21V 13/02; F21V 13/14; F21V 29/004; F21V 29/763; F21V 29/89; F21V 31/00; F21V 31/005; G02B 19/0014; G02B 19/0061; G02B 19/0066; G02B 19/0028; G02B 3/04; G02B 3/06; G02B 3/02; G02B 13/18; G02B 5/021; G02B 5/0268; G02B 5/0278; G02B 6/0035; G02B 6/0078
  USPC .............. 362/335, 235, 244, 311.01, 311.02, 362/311.06, 326, 334, 231, 237, 311.08, 362/311.09, 327, 329, 331, 336, 340, 361, 362/555, 92, 97.1; 359/708, 599, 654, 359/710, 719
  See application file for complete search history.

(56) References Cited

U.S. PATENT DOCUMENTS

| | | | | |
|---|---|---|---|---|
| 7,443,609 B2 * | 10/2008 | Yoon | ........................ | G02B 3/04 359/708 |
| 7,572,036 B2 * | 8/2009 | Yoon | ........................ | F21V 5/04 362/331 |
| 7,649,697 B2 * | 1/2010 | Yoon | ........................ | G02B 3/04 359/708 |
| 7,819,560 B2 * | 10/2010 | Ohkawa | ............ | G02B 27/0955 362/311.01 |
| 8,147,100 B2 * | 4/2012 | Yamaguchi | ............. | H01L 33/54 362/311.02 |
| 8,220,958 B2 * | 7/2012 | Montagne | ........... | G02B 27/0955 362/235 |
| 8,585,239 B1 * | 11/2013 | Tseng | ........................ | F21V 5/04 362/244 |
| 8,743,315 B2 * | 6/2014 | Matsuki | ............ | G02B 19/0066 349/62 |
| 8,773,616 B2 * | 7/2014 | Iiyama | ..................... | F21V 5/04 349/64 |
| 9,074,754 B2 * | 7/2015 | Liao | ..................... | G02B 6/0035 |
| 9,134,007 B2 * | 9/2015 | Wang | ..................... | F21V 5/043 |
| 9,200,777 B2 * | 12/2015 | Ikeda | ..................... | F21V 5/04 |
| 9,255,686 B2 * | 2/2016 | Wilcox | ................... | F21V 5/008 |
| 2004/0080835 A1 * | 4/2004 | Chinniah | ............ | F21S 48/2212 359/708 |
| 2008/0101063 A1 * | 5/2008 | Koike | ..................... | F21S 8/088 362/231 |
| 2009/0207586 A1 * | 8/2009 | Arai | ..................... | G02B 5/021 362/97.1 |
| 2010/0135028 A1 * | 6/2010 | Kokubo | ................... | G02B 3/02 362/311.06 |
| 2010/0271708 A1 * | 10/2010 | Wilcox | .............. | G02B 17/0856 359/654 |
| 2011/0279751 A1 | 11/2011 | Iiyama et al. | | |
| 2014/0254134 A1 * | 9/2014 | Pelka | ..................... | F25D 27/00 362/92 |

OTHER PUBLICATIONS

English language translation of abstract for DE patent 20 2013 011 143 U1, dated May 15, 2014.

* cited by examiner

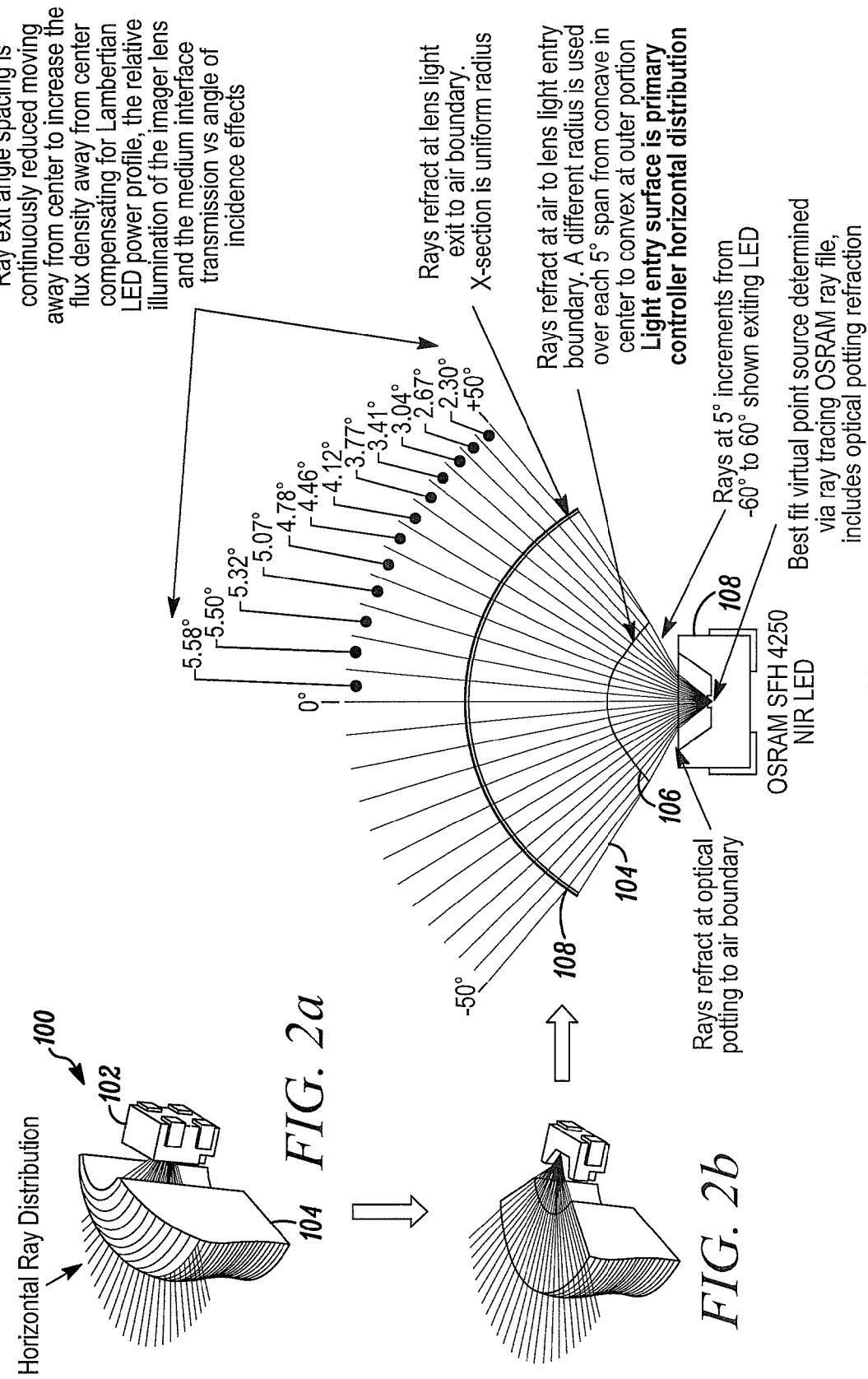

US 9,606,229 B2

HIGHLY EFFICIENT NIR LIGHT DISTRIBUTION FOR IMAGING BASED INTRUSION DETECTION

FIELD

This application relates to security systems and, more particularly, to surveillance systems.

BACKGROUND

Systems are known to protect people and assets within secured areas. Such systems are typically based upon the use of one or more sensors that detect threats within the secured area.

Threats to people and assets may originate from any of a number of different sources. For example, an unauthorized intruder, such as a burglar, may present a threat to assets within a secured area due to theft. Intruders have also been known to injure or kill people living within the area.

Intruders may be detected via switches placed on the doors or windows of a home. Alternatively, the area may be monitored via a number of security cameras.

Security cameras may be used either actively or passively. In a passive mode, a guard may monitor images from each of the cameras through a monitor placed at a guard station. When the guard detects a threat, the guard may take the appropriate action (e.g., call the police, etc.).

Alternatively, the cameras may be used to actively detect threats. For example, a processor within the camera or elsewhere may monitor successive frames from the camera to detect changes that indicate the presence of an intruder. Upon detecting an intruder, the processor may alert a guard to the possibility of an intruder.

Many security systems operate automatically without the need for a human guard. In this type of system, a person arms the system when he leaves and disarms the system when he returns.

Once armed, a security panel monitors perimeter switches for activation and cameras for motion. While such systems work well, they do not always work well in darkened areas or where visibility is poor. Accordingly, a need exists for better methods of detecting intruders.

BRIEF DESCRIPTION OF THE DRAWINGS

FIGS. 2*a*-2*c* depict details of the light distribution lens of FIG. 1 providing horizontal distribution of light;

DETAILED DESCRIPTION

Figure 1:
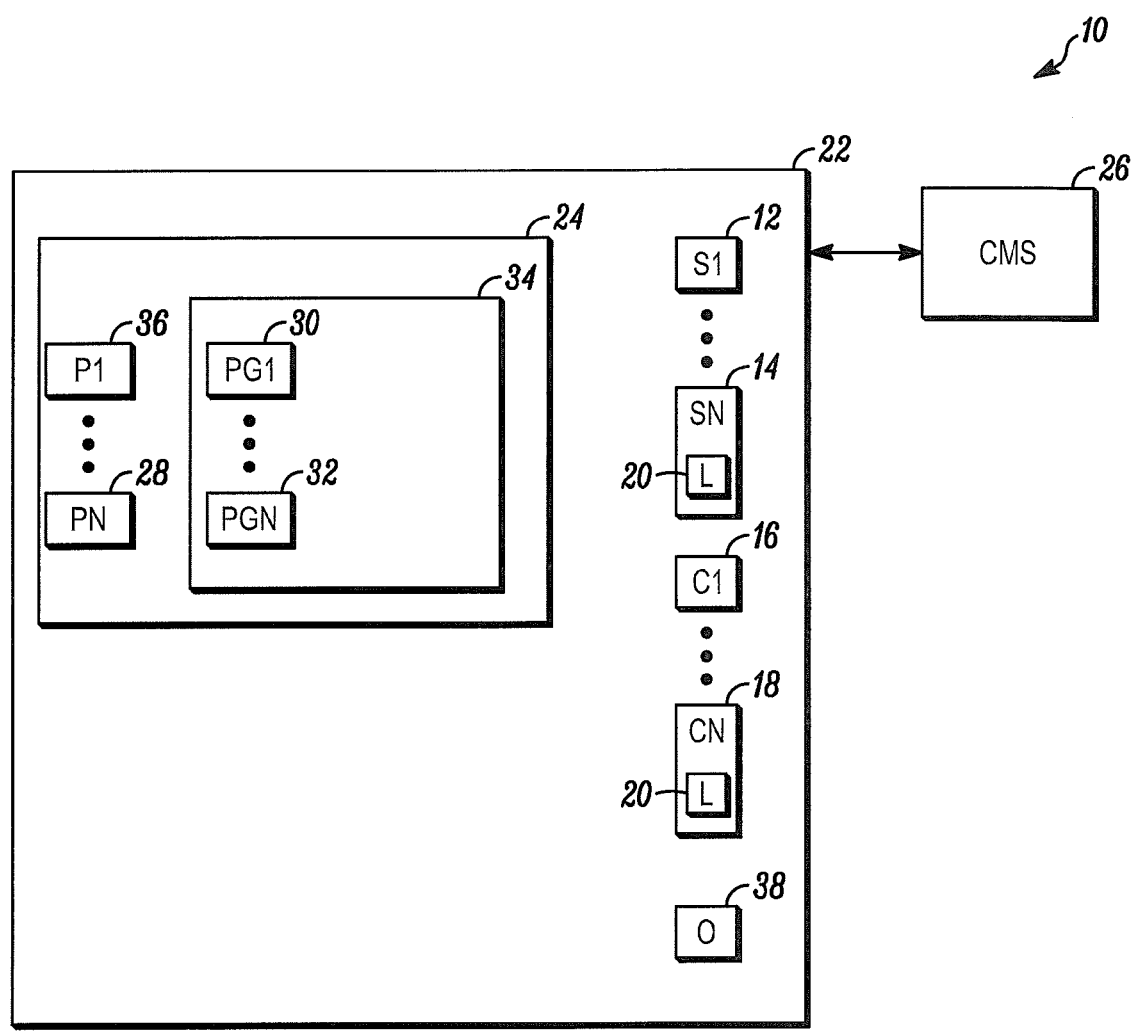
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system is a number of sensors 12, 14 and/or cameras 16, 18 used to protect a secured area 22. The sensors may include one or more limit switches that may be placed on the doors and/or windows providing access into and egress from the secured area. The sensors may also include one or more passive infrared (PIR) devices that detect intruders within the secured area.

The sensors and cameras may be monitored via a control panel 24. Upon activation of one of the sensors or detection of an intruder via one of the cameras, the control panel may compose and send an alarm message to a central monitoring station 26. The central monitoring station may respond by summoning the appropriate help (e.g., police, fireman, etc.).

Included within the control panel, the sensors, and/or the cameras may be one or more processor apparatuses (processors) 28, 36 each operating under control of one or more computer programs 30, 32 loaded from a non-transient computer readable medium (memory) 34. As used herein, reference to a step performed by a processor is also reference to the processor that executed that step of the computer program.

Included within imaging based detectors that incorporate a camera and/or PIR sensors incorporating a camera may be a light distribution lens 20 (hereinafter referred to as "the lens," which is not to be confused with the imaging lens that forms part of a camera). Under one illustrated embodiment, the lens may be used to improve illumination of an object (e.g., an intruder) 38 within the secured area.

In general, a need exists for a low cost wireless image based motion detector that has a long battery life. An image based motion detector can solve the many deficiencies related to passive infrared (PIR) motion detectors (e.g., missed detections caused by high ambient temperatures within a room, false alarms caused by pets, the ability to discriminate between pets and crawling humans, etc.). However, unlike a conventional PIR motion detector, an image based motion detector based on lower cost charge coupled device (CCD) technologies cannot "see" in the dark. When light levels fall below a certain level, the image based motion detector must illuminate the protected area to determine the scene content that may include an intruder.

Typically, a PIR motion detector containing a camera, an image based motion detector, or a surveillance camera will be equipped with many near infrared (NIR) light emitting diodes (LEDs) to illuminate the area to be protected. In conventional devices, these LEDs are placed behind a NIR transparent window. In this case, the illumination pattern is simply a function of the light distribution pattern of the LED (e.g., narrow angle or wide angle Lambertian patterns, etc.).

Conventional illumination devices do not efficiently illuminate an area to be protected because of a number of factors, including the facts that much of the light energy goes over the head of an intruder at long range, the light intensity in the near field is much higher than needed, the energy levels fall off to the sides of the area to be protected due to the nature of the LED pattern, and the imager's lens causes a lower sensitivity at the periphery of the field of view (FOV) than in the center.

Under illustrated embodiments, an efficient distribution of light will minimize current drawn from the batteries, maximize battery life, reduce the number of batteries needed, and minimize the number of LEDs required in a product. With this approach, the cost and product size can be reduced while achieving a long battery life.

FIG. 2a is a simplified top perspective view of the light generating portion of an optical intrusion detector 100 (i.e., one of the sensors 12, 14 or cameras 16, 18 incorporating the light distribution lens 20). In FIG. 2a, the NIR LED has been referred to by the reference number 102. Similarly, the light distribution lens has been referred to by the reference number 104. In order to simplify the description of the lens 104, it will be assumed that the optical device 102 is a near infrared light emitting diode (NIR LED) 108.

Figures 3A, 3B, 3C:
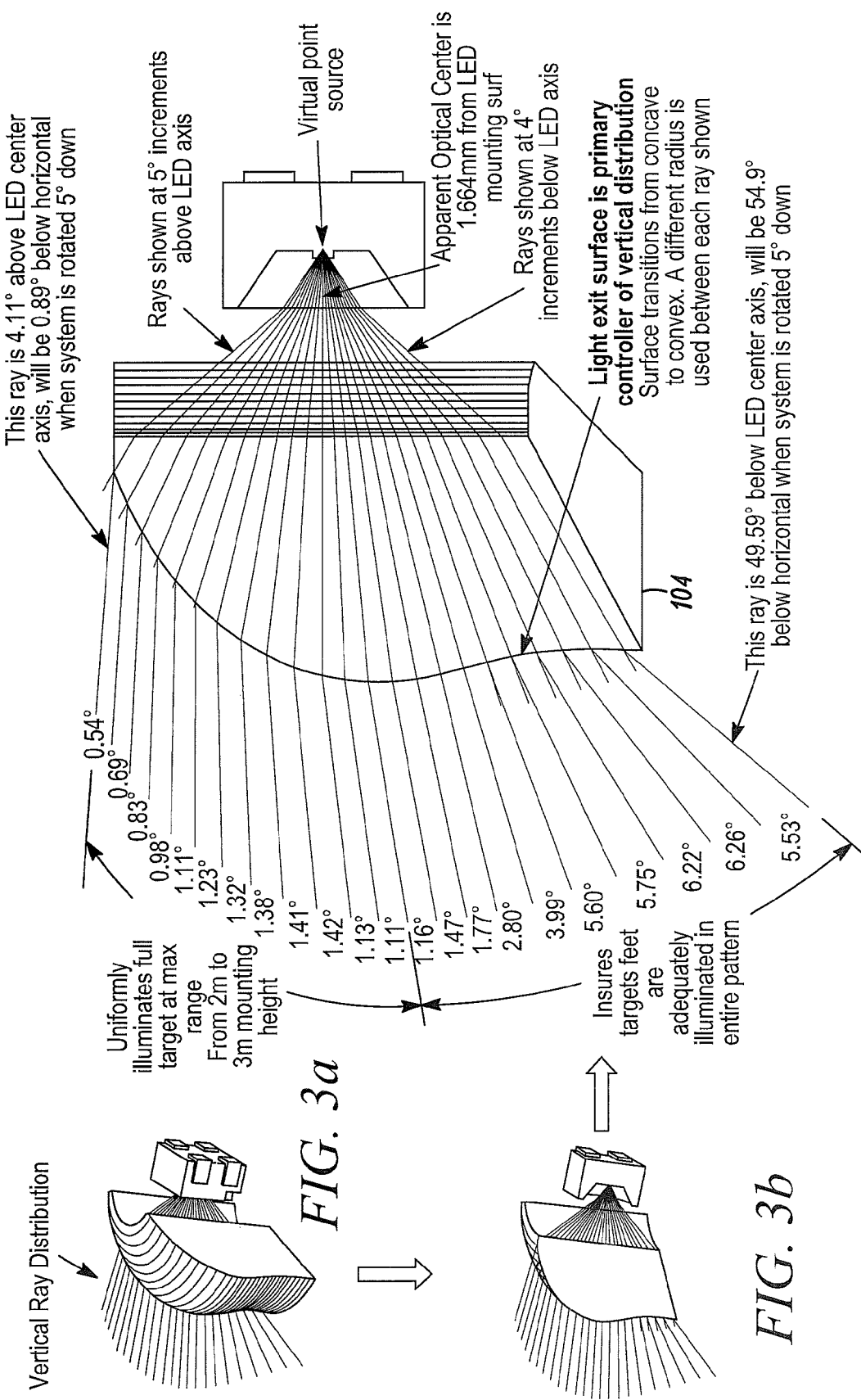
FIGS. 3*a*-3*c* depict details of the lens of FIG. 1 providing the vertical distribution of light.

In general, FIGS. 2b-2c will be used to describe the distribution of NIR light in the horizontal direction. FIGS. 3b-3c will be used to describe the distribution of light in the vertical direction.

In FIG. 2c, the ray marked as zero degrees will be assumed to be the predominant axis of NIR light transmission from the LED in the horizontal direction. Similarly, in FIG. 3c, the ray marked as zero degrees will be assumed to be the predominant axis of NIR light transmission from the same LED in the vertical direction.

FIG. 2b is a cut-away view showing the horizontal plane of light distribution from the LED through and exiting the lens. FIG. 2c displays details of the light distribution along the horizontal plane shown in FIG. 2b.

In general, the horizontal distribution of light is controlled by a series of cylindrical surfaces at the air to lens boundary (inside surface or light entry surface) 106 of the lens. In this regard, the radii of cylinders forming the light entry surface of the lens progressively increase from the predominant axis towards a distal end of the lens in the horizontal plane shown. By increasing the radius of the air to lens boundary over each predetermined angle (e.g., 5 degrees), light is preferentially distributed away from the predominant axis of NIR light transmission from the LED via refraction. In this regard, a different radius is used over each 5 degree span extending outwards from the center. Stated in another way, the radius of the inside curvature is continuously increased, extending outwards from the center from concave at the center to convex on the peripheral edges of the lens when viewed from a horizontal plane.

The lens to air boundary (outside surface or light exit surface of the lens) 108 may have a constant radius in any individual horizontal plane, but may vary from horizontal plane to horizontal plane. The combination of the increasing radius on the light entry surface and constant radius on the light exit surface causes the ray exit angles to be continuously reduced moving away from the center as viewed in any horizontal plane. The reduced ray exit angles increase the parent LED flux density away from the center, thereby compensating for a number of factors, including the Lambertian LED power profile, the relative illumination of an imager lens, and the medium interface transmission versus angle of incidence effects. In general, the light entry surface of the lens is the primary controlling element in horizontal light distribution.

Similarly, FIG. 3b is a vertical cut-away view through the predominant axis of NIR light transmission from the LED, and FIG. 3c shows the distribution of flux from the LED through and exiting the lens. As shown in FIGS. 3b-3c, the primary controller of the distribution of light in the vertical direction is the curvature of the lens to air boundary (outside or light exit surface) of the lens. In this embodiment, the light exit surface is comprised of toroidal surfaces of varying cross-sectional surface radii. To achieve the desired vertical light distribution, the radius is increased between each 5 degree angle increment light exit ray from the LED above the predominant axis of the LED and reduced between each 4 degree increment light exit ray from the LED below the predominant axis of the LED to reach a minimum radius between 4 and 8 degrees refracted LED exit ray below which the radius successively increases to a transition from convex to concave at the 24 degree refracted LED exit ray below the predominant LED axis where the radius then successively decreases to a local minimum at the 32 degree ray and then successively increases. As shown in FIG. 3c, the uppermost ray from the lens angles upwards by an angle of 4.11 degrees above the predominant axis of the LED. Similarly, the bottom ray angles downwards at an angle of 49.59 degrees below the predominant axis. When installed in the imaging detector, this NIR lighting system will be rotated 5 degrees downward while the detector is mounted between 2.3 and 3.0 meters above the floor. The resulting uppermost ray will, therefore, be angled downward at 0.89 degrees to ensure the illumination of the top of the head of a 6 foot tall intruder at 12 meters distance.

In FIGS. 3b and 3c, the light exit surface radii are different between each ray shown to control the distribution. The exit surface curve is the continuous sum of each radius segment increment. This curve is revolved about a vertical axis that passes through the apparent optical center of the LED to form the continuous range of light distribution. Each light exit segment forms a portion of a toroid.

FIGS. 2a-2c and 3a-3c disclose a lens that solves the problem of re-distributing light based upon distance. The lens is specifically designed in a first instance to distribute light vertically to achieve one set of goals and in a second instance to distribute the light horizontally to achieve a second set of goals. The vertical light distribution goal is to send the majority of light energy to the far field and to progressively reduce the radiant intensity power (power per solid unit angle) hitting the floor from the far field into the near field. If the radiant intensity emitted from the source (LED) was uniform in all directions, then the irradiance (power per unit area or brightness) on a target would be inversely proportional to the distance to the target squared. This is to say that a target at 3 meters would have 4 times the "brightness" of a target at 6 meters and 16 times the "brightness" of a target at 12 meters. Therefore, any light energy that can be redirected from a target in the near field to a target in the far field would help to achieve this goal. This light distribution must take into account the fact that most LEDs emit energy in a Lambertian fashion, meaning that the radiant intensity drops with the cosine of the angle from the center ray. Additionally, any energy that goes above the target's head when the target is at maximum range, for example, 12 meters, that can be redirected onto the target at 12 meters helps in achieving an efficient light distribution. The more specific goal from the vertical distribution is to maintain uniform irradiance on the target at 12 meters and as the target gets closer to the sensor and maintain this same irradiance on the feet of the target at all distances up to the sensor. This, combined with minimal energy going overhead of the target at a maximum range, will result in the optimized vertical energy distribution.

The general horizontal light distribution goal is to send some of the energy from the high intensity region in the center of the LED pattern to the sides to compensate for the intensity reduction with increased angle. Also, in general, any energy that would otherwise go beyond a small margin outside of the protected area, for example, 5 degrees, that can be redirected inside the protected area goes to achieve a more efficient distribution. The specific goal is to redirect as much energy as possible that would have gone outside the protected area back inside the protected area and create an energy distribution that compensates for the relative illumination of the imager lens.

Relative illumination (RI) indicates the efficiency of an imaging lens with respect to viewing angles. For two targets containing identical illumination, one positioned at 0 degrees (along a centerline axis of the imaging lens), the other at X degrees, the RI is the perceived radiant intensity sensed by the imager's pixels for a target at X degrees divided by the perceived radiant intensity for the target at 0 degrees. Higher cost conventional multiple lens element systems (three or more stacked lens elements) can achieve an RI at 45 degrees that is near 1.0 while lower cost lens systems (one or two lens elements, e.g., the Sunny 2017Q) exhibit a RI of 0.70 at 45 degrees. In the lower cost conventional lenses, the RI falls off with the cosine of the viewing angle. A low cost conventional imaging lens (RI=0.70 at +/−45 degrees) coupled with Lambertian LEDs (radiant intensity=0.71 at +/−45 degrees) results in a perceived radiant intensity of 50% at +/−45 degrees. To optimize the light distribution horizontally, the LED lens system must be specifically designed to compensate for the RI of the imaging lens and the intensity distribution of the LEDs being used. In absolute terms, the radiant intensity on a target at a given distance at any horizontal angle in the protected area, when compared to the same target at the same distance at 0 degrees, is to be the inverse of the imaging lens RI at that angle. As described above, the prior art does not make use of lenses on LEDs, the prior art does not alter the LED illumination patterns, and there have been no attempt to compensate for the RI of the imaging lens.

Figure 4:
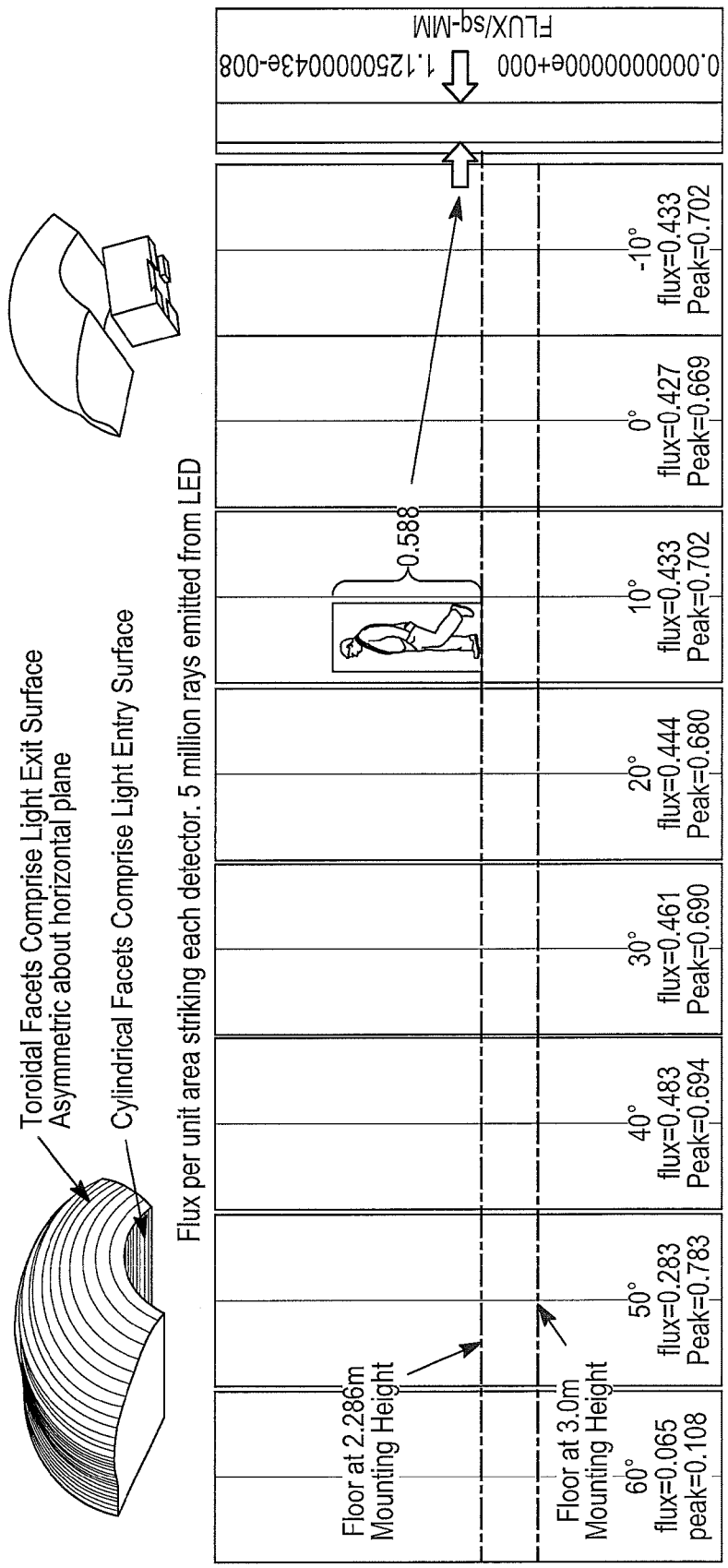
FIG. 4 depicts the horizontal distribution of light provided by the lens of FIG. 1 on surfaces placed radially at 12 meters from the sensor.
Figure 5:
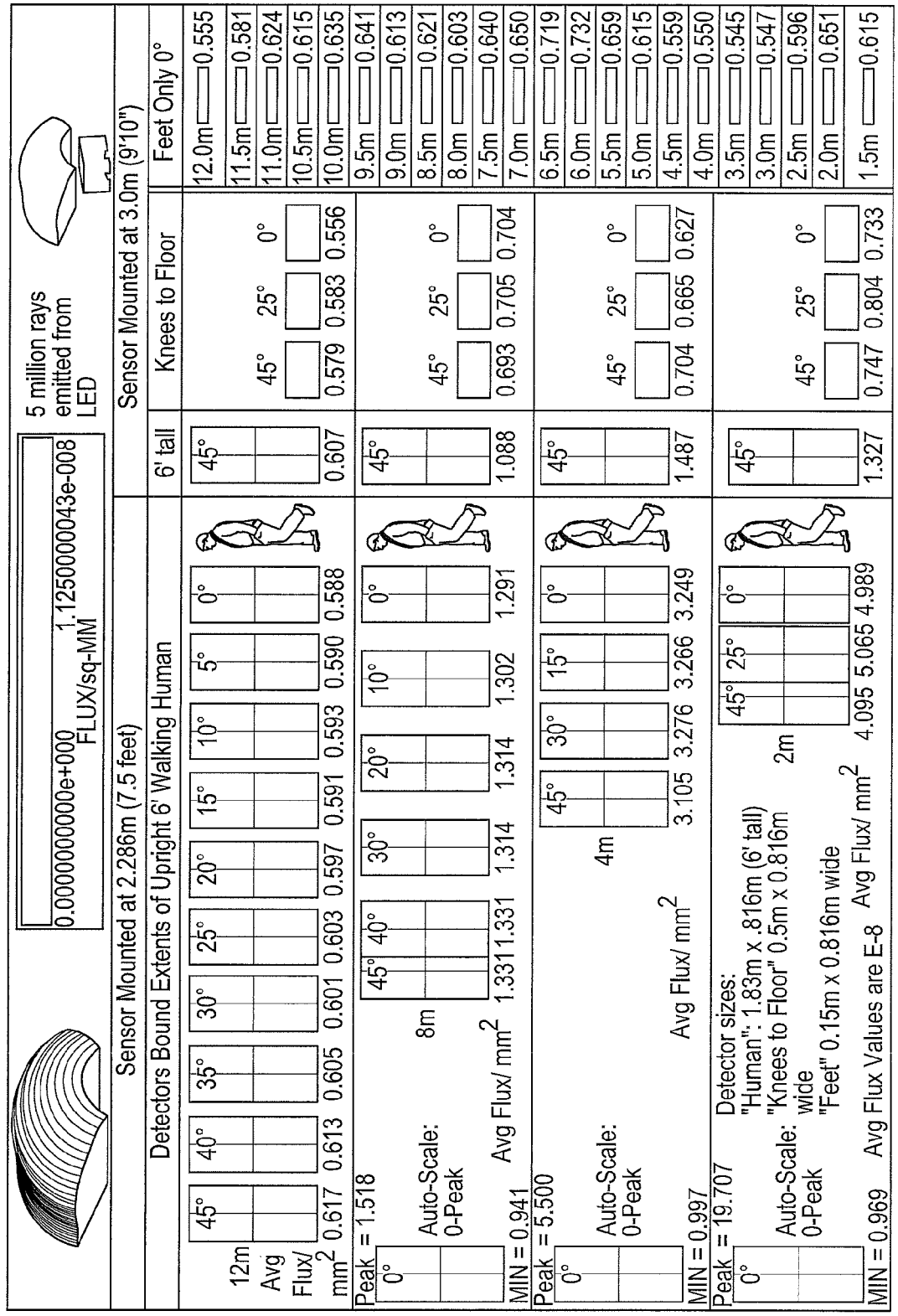
FIG. 5 depicts both the horizontal and vertical distribution of light provided by the lens of FIG. 1 on surfaces at various radial distances from the sensor.

FIGS. 4 and 5 depict the vertical and horizontal light distribution of the lens. FIG. 4 shows the vertical distribution of flux provided by the lens. As shown in FIG. 4, the average flux density on the 6 meter tall by 2 meter wide panel position at 12 meters from the sensor and rotated to 10 degrees left of the system center (center is shown as 0 degrees) is 0.433 with a peak value of 0.702. Similarly, on an identical panel rotated to 40 degrees left of the system center, the average flux density is 0.483 with a peak of 0.694. This figure illustrates that the example embodiment does achieve some of the design goals, including little energy going over the head of the intruder when the sensor is mounted at 2.3 meters off the floor, the illumination on the target intruder not changing when the sensor is mounted at a maximum height of 3.0 meters, energy dissipating quickly below a floor that is at 3.0 meters below the sensor, little energy going beyond 50 degrees horizontally, wasting little energy, and the average flux density on the target panel increasing 5% over the horizontal range to exactly compensate for the RI of the lens that is intended to be used in the image detector.

FIG. 5 shows both the horizontal and vertical light distribution throughout the intended protected region for the imaging detector, i.e., plus/minus 45 degree horizontal pattern that goes out to a 12 meter arc centered on the detector. The figure shows various size vertically oriented panels at varying distances and horizontal rotation angles, all with the bottom of each panel resting on the floor. The left side of the figure shows human sized panels with the illumination intensities from the NIR LED lens system when mounted 2.3 meters above the floor while the right side shows some human sized panels, panels that only extend from the floor to a person's knees, and others that extend from the floor to the top of the intruder's feet, all of which contain the illumination intensity levels from the NIR LED lens system when mounted 3.0 meters above the floor. As shown in the human sized panels at 12 meters with a 2.3 meter mounting height, the flux density in each panel is quite uniform vertically over the height of a person while, horizontally, the average flux density on a panel increases from 0.588 at the center to 0.617 at 45 degrees, exactly increasing 5% over the range to compensate for the RI on the imaging lens to be used, which has an RI of 0.95 at 45 degrees. Comparing this to the same LED without the lens, the values drop to 0.228 and 0.159, respectively. The lens provides a 4× increase at 45 degrees. The right hand column of panels in FIG. 5 shows that the flux density at the feet of the intruder is relatively constant extending from the detector out to 12 meters with a value of 0.615 at 1.5 meters and a value of 0.555 at 12 meters. By comparison, the bare LED generates values of 1.05 and 0.208, respectively, or an intensity distribution that varies five fold.

In general, the apparatus includes a near infrared (NIR) light emitting diode (LED) having a predominant axis of NIR light transmission from the NIR LED and a lens that disperses NIR light received from the NIR LED with respect to first and second planes, the first and second planes being normal to each other and intersecting along the predominant axis, the lens having an air to lens light entry boundary where light from the NIR LED enters a surface of the lens and a lens to air boundary where the light exits the lens in each of the first and second planes, the first and second planes intersecting with the surface, wherein an intersection formed by the second plane with the surface is a line that is concave on each side of the predominant axis, and wherein a radius of the air to lens light entry boundary of the line successively increases over each span of a predetermined number of degrees progressing outwards along the line from the predominant axis.

Alternatively, the apparatus includes a lens that focuses near infrared (NIR) light from an optical device onto an external object, the optical device having a predominant axis of NIR light transmission with respect to first and second planes, the first and second planes being normal to each other and intersecting along the predominant axis, the lens having a first air to lens light boundary on a first surface of the lens facing the external object and a second air to lens boundary on a second surface of the lens facing the optical device in each of the first and second planes, the first plane and the second plane intersecting with the first and second surfaces, wherein an intersection formed by the first plane with the second surface is a line symmetric around the predominant axis, wherein an intersection formed by the second plane with the second surface is a second line that is concave on each side of the predominant axis, and wherein a radius of the second line on the second air to lens boundary of the second surface successively increases over each span of a predetermined number of degrees from the predominant axis to a point of inflection of the second line on the second surface beyond which the second air to lens boundary becomes convex between the point of inflection and a distal end of the second line.

Alternatively, the apparatus includes a security system that protects a secured area, an optical device of the security system, and a lens of the optical device that focuses near infrared (NIR) light from the optical device received along a predominant axis of the optical device with respect to first and second planes, the first and second planes being normal to each other and intersecting along the predominant axis, the lens having a first air to lens light boundary on a first surface of the lens facing the secured area and a second air to lens boundary on a second surface of the lens facing the optical device in each of the first and second planes, the first plane and the second plane intersecting with the first and second surfaces, wherein an intersection formed by the first plane with the second surface is a straight line symmetric around the predominant axis, wherein an intersection formed by the second plane with the second surface is a second line that is concave on each side of the predominant axis, and wherein a radius of the second line on second the air to lens boundary of the second surface successively increases over each span of a predetermined number of degrees from the predominant axis to a point of inflection of the second line on the second surface beyond which the second air to lens boundary becomes convex between the point of inflection and a distal end of the second line.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
   a near infrared (NIR) light emitting diode (LED) having a predominant axis of NIR light transmission from the NIR LED; and
   a lens that disperses NIR light received from the NIR LED with respect to first and second planes, the first and second planes being normal to each other and intersecting along the predominant axis, the lens having an air to lens light entry boundary where light from the NIR LED enters a surface of the lens and a lens to air boundary where the light exits the lens in each of the first and second planes, the first and second planes intersecting with the surface,
   wherein an intersection formed by the second plane with the surface is a line that is concave on each side of the predominant axis,
   wherein a radius of the air to lens light entry boundary of the line successively increases over each span of a predetermined number of degrees progressing outwards along the line from the predominant axis, and
   wherein the lens optimizes available NIR energy from the NIR LED by redistributing the available NIR energy in a region to be protected in a high intensity and uniform manner.

2. The apparatus as in claim 1 wherein the radius of the air to lens light entry boundary successively increases to a point of inflection in the surface beyond which the air to lens boundary becomes convex and extends out to a distal end of a second line.

3. The apparatus as in claim 1 wherein an intersection formed by the first plane with the surface comprises a straight line extending on both sides of the predominant axis.

4. The apparatus as in claim 1 wherein the second plane comprises a horizontal axis.

5. The apparatus as in claim 1 wherein the lens to air boundary in the second plane comprises a convex surface having a constant radius.

6. The apparatus as in claim 1 wherein a radius of the lens to air boundary in the first plane beginning at an upper distal end of the lens successively decreases over each span of the predetermined number of degrees to a point below the predominant axis, and wherein the radius of the lens to air boundary in the first plane reaches a minimum and then increases to a point of inflection in the lens to air boundary beyond which a surface of the lens to air boundary becomes concave out to a lower distal end.

7. The apparatus as in claim 1 wherein the predetermined number of degrees is five.

8. The apparatus as in claim 1 wherein the first plane comprises a vertical axis.

9. The apparatus as in claim 8 wherein the light exits the lens from an upper distal end of the first plane 4.11 degrees above the predominant axis.

10. The apparatus as in claim 8 wherein the light exits the lens from a lower distal end 49.59 degrees below the predominant axis.

11. An apparatus comprising:
    a lens that directs near infrared (NIR) light from an optical device onto an external object, the optical device having a predominant axis of NIR light transmission with respect to first and second planes, the first and second planes being normal to each other and intersecting along the predominant axis, the lens having a first air to lens light boundary on a first surface of the lens facing the external object and a second air to lens boundary on a second surface of the lens facing the optical device in each of the first and second planes, the first plane and the second plane intersecting with the first and second surfaces,
    wherein an intersection formed by the first plane with the second surface is a line that is normal or nearly normal to the predominant axis,
    wherein an intersection formed by the second plane with the second surface is a second line that is concave from a point of view of the lens and symmetric about the predominant axis,
    wherein a radius of the second line on the second air to lens boundary of the second surface successively increases over each span of a predetermined number of degrees from the predominant axis to a point of inflection of the second line on the second surface beyond which the second air to lens boundary becomes convex between the point of inflection and a distal end of the second line, and
    wherein the lens optimizes NIR energy impinging on the lens from the optical device by redistributing the NIR energy impinging on the lens from the optical device in a region to be protected in a high intensity and uniform manner.

12. The apparatus as in claim 11 wherein the optical device comprises a light emitting diode (LED) that illuminates the external object through the lens.

13. The apparatus as in claim 11 wherein the line formed by the intersection of the first plane with the second surface comprises a straight line.

14. The apparatus as in claim 11 wherein a distal end of the first line on the second surface is plus and minus fifty degrees from the predominant axis.

15. The apparatus as in claim 11 wherein the first air to lens boundary in the second plane on the first surface comprises a convex lens surface having a constant radius.

16. The apparatus as in claim 11 wherein the NIR light interacts with the first surface of the lens at a first distal end with an angle that is 4.11 degrees above the predominant axis.

17. The apparatus as in claim 11 wherein the NIR light interacts with the first surface of the lens at a second distal end with an angle that is 49.59 degrees below the predominant axis.

18. An apparatus comprising:
a security system that protects a secured area;
an optical device of the security system; and
a lens of the optical device that focuses near infrared (NIR) light from the optical device received along a predominant axis of the optical device with respect to first and second planes, the first and second planes being normal to each other and intersecting along the predominant axis, the lens having a first air to lens light boundary on a first surface of the lens facing the secured area and a second air to lens boundary on a second surface of the lens facing the optical device in each of the first and second planes, the first plane and the second plane intersecting with the first and second surfaces,
wherein an intersection formed by the first plane with the second surface is a straight line symmetric around the predominant axis,
wherein an intersection formed by the second plane with the second surface is a second line that is concave on each side of the predominant axis,
wherein a radius of the second line on the second air to lens boundary of the second surface successively increases over each span of a predetermined number of degrees from the predominant axis to a point of inflection of the second line on the second surface beyond which the second air to lens boundary becomes convex between the point of inflection and a distal end of the second line, and
wherein the lens optimizes NIR energy impinging on the lens from the optical device by redistributing the NIR energy impinging on the lens from the optical device in a region to be protected in a high intensity and uniform manner.

19. The apparatus as in claim 18 wherein the optical device comprises one of a light emitting diode and a camera.

20. The apparatus as in claim 18 wherein the optical device comprises a mounting height of 2.3 meters.

* * * * *